April 12, 1955  C. C. STRICKLEN  2,706,137
BALL BEARING ASSEMBLY
Filed Sept. 10, 1954
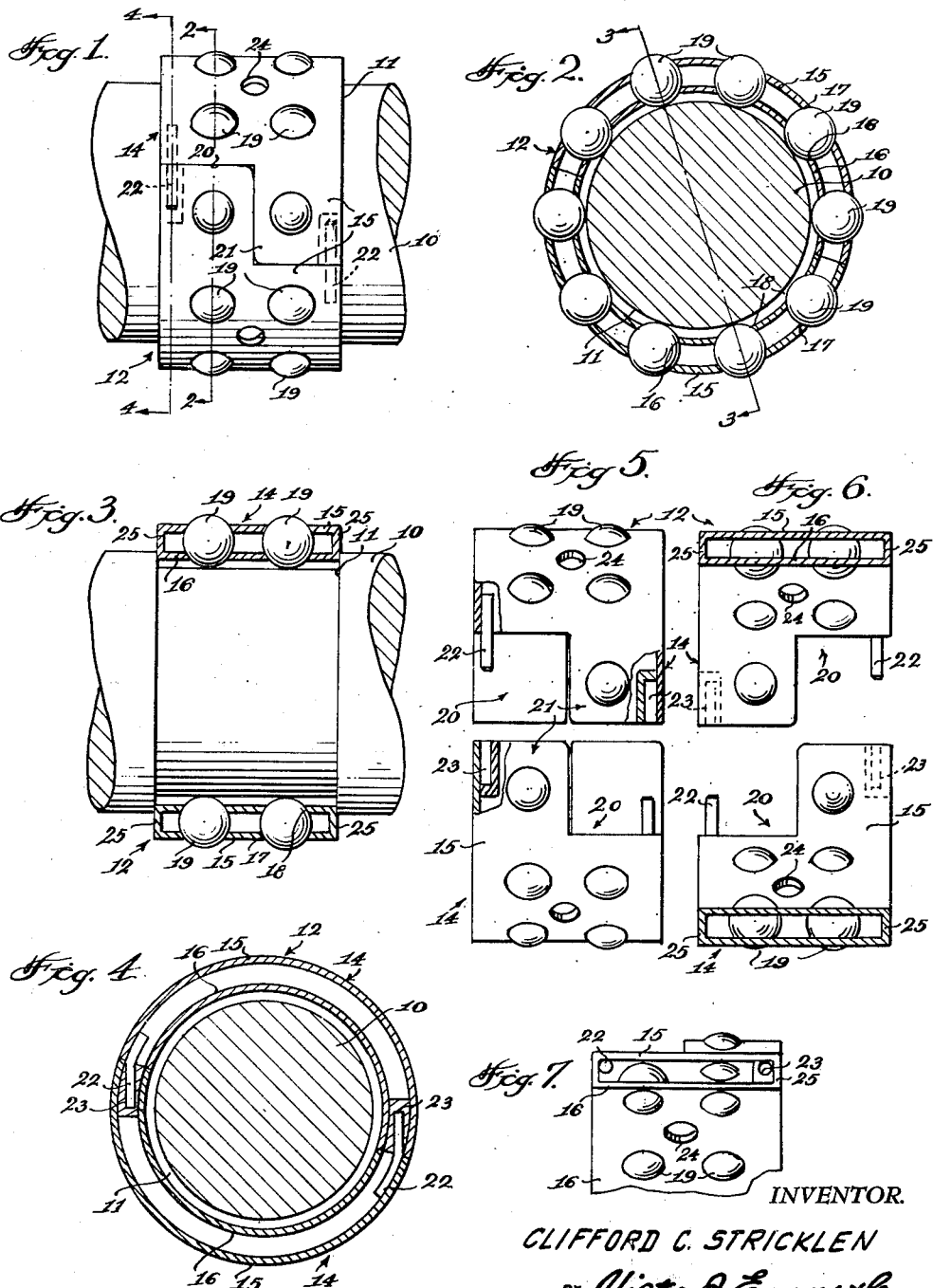
INVENTOR.
CLIFFORD C. STRICKLEN
BY Victor J. Evans & Co.
ATTORNEYS

United States Patent Office 2,706,137
Patented Apr. 12, 1955

2,706,137

BALL BEARING ASSEMBLY

Clifford C. Stricklen, Burnsville, Miss.

Application September 10, 1954, Serial No. 455,231

1 Claim. (Cl. 308—201)

This invention relates to a ball bearing assembly.

The object of the invention is to provide a ball bearing assembly which includes a pair of similar sections that are detachably connected together.

Another object of the invention is to provide a ball bearing assembly that is adapted to be mounted on a crankshaft for engagement with a connecting rod of an engine such as an internal combustion engine wherein the ball bearing assembly is adapted to be used in lieu of the usual babbitt bearing so that the parts will operate more smoothly.

A further object of the invention is to provide a ball bearing assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view showing the ball bearing assembly assembled on a shaft.

Figure 2 is a sectional view taken on the line 2—2 of Figure 1.

Figure 3 is a sectional view taken on the line 3—3 of Figure 2.

Figure 4 is a sectional view taken on the line 4—4 of Figure 1.

Figure 5 is an elevational view showing the sections disconnected from each other.

Figure 6 is a sectional view through the sections with the sections disconnected from each other.

Figure 7 is an end elevational view of one of the sections.

Referring in detail to the drawings, the numeral 10 designates a portion of a shaft having an annular groove or recess 11 therein which defines a trackway, and positioned in the recess 11 is a cylindrical ball bearing assembly which is indicated generally by the numeral 12.

The ball bearing assembly 12 includes a pair of similar sections 14 which have a semi-circular shape. Each of the sections 14 have the same construction and each includes a curved outer wall 15 and a curved inner wall 16, the walls 15 and 16 being arranged in spaced parallel relation with respect to each other. The outer wall 15 is provided with a plurality of spaced openings 17, and the inner wall 16 has a similar set of openings 18, and the openings 17 and 18 are arranged in registry with respect to each other. Ball members or balls 19 are seated in these registering openings 17 and 18, and the balls project beyond the surfaces of the walls 15 and 16. Thus, the inner surfaces of the balls 19 may engage a shaft such as the shaft 10, while the outer portions of the balls 19 may engage a connecting rod or other member.

The ends of each of the sections 14 are cut away or recessed as at 20 and the recessed portion 20 defines a projecting portion 21. A pin 22 extends from each end of each section 14, and the pins 22 may be secured in place as by welding. Portions of the pins 22 project into the recessed portion 20. Each of the projecting portions 21 has a socket member 23 secured therein as by welding, and the socket members 23 serve to snugly receive the pins 22 of the complementary section 14. Thus, the pins 22 coact with the socket members 23 to form a means for detachably connecting the sections 14 together. When the pair of sections 14 are assembled together, the projecting portion 21 of one section snugly seats in the recessed portion 20 of the other section as shown in Figure 1. Thus, a unitary cylindrical ball bearing assembly is provided which can be easily assembled on a shaft or the like since it consists of two parts which are easily connected together. A plurality of recesses or openings 24 are provided in the walls of the ball bearing assembly whereby suitable lubrication such as oil may be supplied to the ball bearing assembly. Spaced parallel curved end walls 25 interconnect the inner and outer walls 15 and 16 together.

From the foregoing it is apparent that there has been provided a ball bearing assembly which is adapted to be mounted on a shaft 10 which may be a crankshaft of an internal combustion engine. The ball bearing assembly can be readily mounted or assembled on the shaft 10 by interfitting and interconnecting the pins 22 and sockets 23 together. The balls 19 maintain the inner wall 16 of the ball bearing assembly spaced from the shaft as shown in Figure 4.

The ball bearing assembly of the present invention will rotate more smoothly than the conventional batted type bearings now used between conducting rods and crankshafts.

I claim:

In combination, a shaft provided with an annular recess, an annular ball bearing assembly seated in said recess and including a pair of similar sections detachably connected together, said pair of sections having the same diameter and thickness, each of said sections including an inner and outer wall arranged in spaced parallel relation with respect to each other, curved spaced parallel end walls extending between said inner and outer walls, there being a plurality of registering openings in said inner and outer walls, balls rotatably seated in said registering openings, an end of each of said sections being cut away to provide a projecting portion and a recessed portion, said projecting portions and recessed portions being of rectangular shape, a socket member secured in each of said projecting portions, and pins extending from said recessed portions and seated in said socket members, the outer ends of said pins being tapered to facilitate insertion of the pins in said sockets, the outer ends of said projecting portions extending beyond the outer ends of said pins.

References Cited in the file of this patent

UNITED STATES PATENTS

| | | |
|---|---|---|
| 1,340,310 | Wolff | May 18, 1920 |
| 1,459,718 | Bott | June 26, 1923 |
| 2,464,712 | Pearson | Mar. 15, 1949 |
| 2,659,636 | Wheelis | Nov. 17, 1953 |